United States Patent
James

(10) Patent No.: US 6,496,907 B1
(45) Date of Patent: Dec. 17, 2002

(54) SYSTEM AND METHOD FOR UPDATING FROM A READ-ONLY TO A READ-WRITE ENTRY AND CONCURRENTLY INVALIDATING STALE CACHE COPIES FROM HEAD-TO-TAIL AND TAIL-TO-HEAD DIRECTIONS

(75) Inventor: David V. James, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/426,058

(22) Filed: Oct. 22, 1999

(51) Int. Cl.[7] .............................................. G06F 12/00
(52) U.S. Cl. ...................... 711/159; 711/133; 711/137; 711/141; 711/156
(58) Field of Search ................................. 711/133, 137, 711/141, 144, 145, 155, 156, 159, 168, 124, 135, 121, 136, 146; 709/201, 207, 213, 224, 225, 226, 231, 234, 248, 322; 710/200; 707/8

(56) References Cited

U.S. PATENT DOCUMENTS

| | | | |
|---|---|---|---|
| 4,747,043 A | * 5/1988 | Rodman | 711/124 |
| 5,060,144 A | * 10/1991 | Sipple et al. | 710/200 |
| 5,546,579 A | * 8/1996 | Josten et al. | 707/8 |
| 5,675,763 A | * 10/1997 | Mogul | 711/135 |
| 5,737,568 A | * 4/1998 | Hamaguchi et al. | 711/121 |
| 5,787,476 A | * 7/1998 | Laudon et al. | 711/141 |
| 5,809,528 A | * 9/1998 | Miller et al. | 711/136 |
| 5,832,263 A | * 11/1998 | Hansen et al. | 709/322 |
| 5,898,854 A | * 4/1999 | Abramson et al. | 712/218 |
| 5,900,015 A | * 5/1999 | Herger et al. | 711/141 |
| 5,990,913 A | * 11/1999 | Harriman et al. | 345/531 |
| 5,995,967 A | * 11/1999 | Iacobovici et al. | 707/100 |
| 6,035,376 A | * 3/2000 | James | 711/145 |
| 6,052,761 A | * 4/2000 | Hornung et al. | 711/141 |
| 6,094,709 A | * 7/2000 | Baylor et al. | 711/141 |
| 6,105,113 A | * 8/2000 | Schimmel | 711/146 |
| 6,182,195 B1 | * 1/2001 | Laudon et al. | 711/141 |

* cited by examiner

*Primary Examiner*—David Hudspeth
*Assistant Examiner*—Fred F. Tzeng
(74) *Attorney, Agent, or Firm*—Carr & Ferrell LLP

(57) ABSTRACT

Cache-coherence computer systems represent cache-lines associated with their processors by linked and shared lists, which can be read-only or read-write. In read-only lists all cache-line copies are the same and may be read by multiple processors at the same time, while read-write lists allow only the head of the list to write to its cache and to invalidate stale cache entries after writing. Main memory of the system always points to the head of the list and includes indications of memory-line states for fresh, stale or no cache line exists. A memory line becomes stale when its associated cache line is modified. A read-write processor seeking to update a cache line requires updating the list from read-only to read-write. A copy of the tail entry is created and made the head of the list, resulting in one entry being in two places on the list. The cache is then updated and invalidation starts concurrently in both directions from head-to-tail and from tail-to-head. Having concurrent fast forward and backward invalidations improves the overall invalidation time about four times over a slow forward invalidation alone.

20 Claims, 23 Drawing Sheets

| | OLD STATE | GENERATED REQUEST | RETURNED RESPONSE | NEW STATE |
|---|---|---|---|---|
| (1a) | TAIL | mReadOwned | DONE_F, IDnext | ENDS_TAIL_F |
| (1b) | TAIL | mReadOwned | DONE_S, IDnext | ENDS_TAIL_S |
| (2a) | ENDS_TAIL_F | cMarkPost | DONE | HEADd_INVAL_F |
| (2b) | ENDS_TAIL_F | cMarkPost | BUSY | ENDS_INVAL_F |
| (3a) | ENDS_TAIL_S | cMarkPost | DONE | HEADd_INVAL_S |
| (3b) | ENDS_TAIL_S | cMarkPost | BUSY | ENDS_TAIL_S |
| (4a) | ENDS_INVAL_F | cMarkInval_F | MORE, IDnext | ENDS_INVAL_F |
| (4b) | ENDS_INVAL_F | cMarkInval_F | MORE, IDreq | ONLYd |
| (4c) | ENDS_INVAL_F | cMarkInval_F | BUSY | ENDS_INVAL_F |
| (5a) | ENDS_INVAL_S | cMarkInval_S | MORE, IDnext | HEADd_INVAL_S |
| (5b) | ENDS_INVAL_S | cMarkInval_S | MORE, ID req | ONLYd |
| (5c) | ENDS_INVAL_S | cMarkInval_S | BUSY | HEADd_INVAL_S |
| (6a) | HEADd_INVAL_F | cMarkInval_F | MORE, IDnext | HEADd_INVAL_F |
| (6b) | HEADd_INVAL_F | cMarkInval_F | DONE | ONLYd |
| (6c) | HEADd_INVAL_F | cMarkInval_F | BUSY | HEADd_INVAL_F |
| (7a) | HEADd_INVAL_S | cMarkInval_S | MORE, IDnext | HEADd_INVAL_S |
| (7b) | HEADd_INVAL_S | cMarkInval_S | DONE | ONLYd |
| (7c) | HEADd_INVAL_S | cMarkInval_S | BUSY | HEADd_INVAL_S |
| (8a) | LAST_TAIL | mMarkPost | DONE | INVAL |
| (8b) | LAST_TAIL | mMarkPost | BUSY | LAST-TAIL |
| (9) | ONLYd | STABLE STATE, NO FURTHER REQUEST | | |

FIG. 8

| | OLD ID | OLD STATE | RECEIVED REQUEST | NEW STATE | RETURNED RESPONSE | NEW ID |
|---|---|---|---|---|---|---|
| (1) | IDhead | FRESH | mReadOwned | STALE | DONE_F | IDreq |
| (2) | IDhead | STALE | mReadOwned | STALE | DONE_S | IDreq |

FIG. 9

|  | OLD STATE | REQUEST RECEIVED | RETURNED RESPONSE | NEW STATE |
|---|---|---|---|---|
| (1a) | CORE | cMarkPost | DONE | LAST_TAIL |
| (1b) | OTHERS | cMarkPost | BUSY | SAME |
| (2a) | ENDS_INVAL_F | cMarkInval_F | DONE | HEAD_INVAL_F |
| (2b) | ENDS_INVAL_S | cMarkInval_F | DONE | HEAD_INVAL_S |
| (3a) | ENDS_INVAL_F | cMarkInval_F | BUSY | SAME |
| (3b) | ENDS_INVAL_S | cMarkInval_F | BUSY | SAME |
| (4a) | CORE | cMarkInval_F | DONE, IDneet | INVAL |
| (4b) | CORE | cMarkInval_S | DONE, IDneet | INVAL |
| (5a) | HEAD_INVAL_F | cMarkInval_S | BUSY | SAME |
| (5b) | HEAD_INVAL_S | cMarkInval_S | BUSY | SAME |

FIG. 10

SYSTEM AND METHOD FOR UPDATING FROM A READ-ONLY TO A READ-WRITE ENTRY AND CONCURRENTLY INVALIDATING STALE CACHE COPIES FROM HEAD-TO-TAIL AND TAIL-TO-HEAD DIRECTIONS

This Application is related to co-pending U.S. patent application Ser. No. 09/235,588, entitled "System and Method for Deleting Read-Only Head Entries in Multi-Processor Computer Systems Supporting Cache Coherence with Mixed Protocols," filed on Jan. 22, 1999, now U.S. Pat. No. 6,321,304 which is hereby incorporated by reference.

BACKGROUND OF THE INVENTION

1. Field of the Invention

This invention relates generally to cache coherence in computer systems having multiple processors with caches, and more particularly to a system and method for updating a cache entry from read-only to read-write.

2. Description of the Background Art

Multiple-processor computer systems involve various processors which at the same time may each work on a separate portion of a problem or work on a different problem. FIG. 1 shows a multi-processor system, including a plurality of Central Processing Units (CPUs) or processors 102A, 102B . . . 102N, communicating with memory 104 via interconnect 106, which could be, for example, a bus or a collection of point-to-point links. Processors 102 access data from memory 104 for a read or a write. In a read operation, processor 102 receives data from memory 104 without modifying the data, while in a write operation processor 102 modifies the data transmitted to memory 104.

Each processor 102 generally has a respective cache unit 108A, 108B, . . . 108N, which is a relatively small group of high speed memory cells dedicated to that processor. A processor 102's cache 108 is usually on the processor chip itself or may be on separate chips, but is local to processor 102. Cache 108 for each processor 102 is used to hold data that was accessed recently by that processor. Since a processor 102 does not have to go through the interconnecting bus 106 and wait for the bus 106 traffic, the processor 102 can generally access data in its cache 108 faster than it can access data in the main memory 104. In a normal operation, a processor 102N first reads data from memory 104 and copies that data to the processor's own cache 108N. During subsequent accesses for the same data the processor 102N fetches the data from its own cache 108N. In effect, after the first read, data in cache 108N is the same copy of data in memory 104 except that the data is now in a high-speed local storage. Typically, cache 108N can be accessed in one or two cycles of CPU time while it takes a processor 102 15 to 50 cycles to access memory 104. A typical processor 102 runs at about 333 Mhz or 3 ns (nanoseconds) per cycle, but it takes at least 60 ns or 20 cycles to access memory 104.

A measure of data, typically 32, 64, 128, or $2^n$ bytes, brought from memory 104 to cache 108 is usually called a "cache line." The data of which a copy was brought to cache 108 and which remains in memory 104 is called a "memory line." The size of a cache line or a memory line is determined by a balance of the overhead per read/write operation versus the usual amount of data transferred from memory and cache. An efficient size for a cache line results in transfers spending about 25% of their time on overhead and 75% of their time on actual data transfer.

A particular problem with using caches is that data becomes "stale." A first processor 102A may access data in the main memory 104 and copy the data into its cache 108A. If the first processor 102A then modifies the cache line of data in its cache 108A, then at that instant the corresponding memory line becomes stale. If a second processor, 102B for example, subsequently accesses the original data in the main memory 104, the second processor 102B will not find the most current version of the data because the most current version is in the cache 108A. For each cache-line address, cache coherence guarantees that only one copy of data in cache 108 can be modified. Identical copies of a cache line may be present in multiple caches 108, and thus be read by multiple processors 102 at the same time, but only one processor 102 is allowed to write, i.e., modify, the data. After a processor 102 writes to its cache 108 that processor 102 must "invalidate" any copies of that data in other caches to notify other processors 102 that their cache lines are no longer current.

FIG. 2A shows valid cache lines D0 for caches 108A to 108N whereas FIG. 2B shows cache 108B with an updated cache line D1 and other caches 108A, 108C, and 108N with invalidated cache lines D0. The processors 102A, 102C, and 102N with invalidated cache data D0 in their respective caches 108 must fetch the updated version of cache line D1 if they want to access that data line again.

Normally and for illustrative purposes in the following discussion, cache coherence protocols are executed by processors 102 associated with their related caches. However, in other embodiments these protocols may be executed by one or more specialized and dedicated cache controllers.

There are different cache coherence management methods for permitting a processor 102 to modify its cache line in cache 108 and invalidate other cache lines. One method (related to the present invention) utilizes, for each cache line, a respective "shared list" representing cache-line correspondences by "double-links" where each cache has a forward pointer pointing to the next cache entry in the list and a backward pointer pointing to the previous cache entry in the list. Memory 104 has a pointer which always points to the head of the list.

FIG. 3 shows a linked list 300 of caches 108A . . . 108N with the associated memory 104. Memory 104 has a pointer which always points to the head (cache 108A) of the list while the forward pointers Af, Bf, and Cf of caches 108A, 108B, and 108C respectively point forward to the succeeding caches 108B, 108C, and 108D (not shown). Similarly, backward pointers Nb, Cb, and Bb of caches 108N, 108C, and 108B respectively point backward to the preceding caches. Because each cache unit 108 is associated with a respective processor 102, a linked list representation of cache 108 is also understood as a linked list representation of processors 102.

There are typically two types of cache sharing list. The first type list is the read-only (sometimes called "fresh") list of caches for which none of the processors 102 has permission to modify the data. The second type list is a read-write (sometimes called "owned") list of caches for which the head-of-list processor 102 may have permission to write to its cache 108. A list is considered "stable" after an entry has been completely entered into or completely deleted from the list. Each of the stable list states is defined by the state of the memory and the states of the entries in the shared list. Relevant states of memory include HOME, FRESH, and STALE. HOME indicates no shared list exists, FRESH indicates a read-only shared list, and STALE indicates the shared list is a read-write list and data in the list can be modified. A processor 102 must get authorization to write to or read from memory. A list entry always enters the list as the list head, and the action of entering is referred to as "prepending" to the list. If a list is FRESH (the data is the same as in memory), the entry that becomes the newly created head receives data from memory; otherwise it receives data from the previous list head. In a read-write list, only the head is allowed to modify (or write to) its own cache line and, after the head has written the data, the head must invalidate the other stale copies of the shared list. In one embodiment, invalidation is done by purging the pending invalidated entries of the shared list.

FIGS. 4A–4F illustrate how the two types of list are created and grown. Each of the FIG. 4 includes a before and an after list with states of the list and memory 104. In FIG. 4A, initially memory 104 is in the HOME state, indicating there is no cache shared list. Processor 102A requests permission to read a cache line. Since this is a read request, memory 104 changes from the HOME state to the FRESH state, and the resulting after list 402AR is a read-only list with one entry 108A. Cache 108A receives data from memory 104 because cache 108A accesses data that was previously uncached. This starts the read-only list 402AR.

In FIG. 4B processor 102B requests a read permission to enter the read-only list 402B, which is the same list as 402AR of FIG. 4A. Cache 108B then becomes the head of the list 402BR receiving data line from head 108A. The list 402BR is still a read-only list since both entries of the list have asked for read-only permission, and therefore the memory state remains FRESH.

In FIG. 4C, memory 104 is initially in the HOME state and processor 102A requests a read-write permission. Cache 108A then becomes the head of the list 402CR. Because a read-write permission was requested, list 402CR is a read-write list. As soon as memory 104 grants a read-write permission, memory 104 changes from the HOME state to the STALE state.

In FIG. 4D processor 102B requests a read permission to enter a read-write list 402D. Cache 108B becomes the head of the list 402DR. Since memory 104 is initially in the STALE state, the resulting list 402DR is a read-write list and memory 104 remains in the STALE state.

In FIG. 4E, the initial list 402E is read-only with memory 104 in the FRESH state, and processor 102B requests a write permission. Cache 108B then becomes the head of the list 402ER. Since processor 102B asked for a write permission, memory 104 changes state from FRESH to STALE, and list 402ER is a read-write list.

In FIG. 4F the list 402F is a read-write list and processor 102B requests a write permission. Since list 402F is read-write, list 402FR is also read-write, and memory 104 remains in the STALE state. In a read-write list, only the head is allowed to modify (or write to) its own cache line, and, after the head has written the data, the head must invalidate stale copies of the shared list.

In one prior art embodiment, invalidation is done by purging the stale entries of the shared list. Consequently, this invalidation-by-deletion results in a stable read-write list having only one read-write entry.

FIG. 4G shows the original list 402G and the resulting list 402GR in which only the head 108N remains while other list entries have been deleted after an invalidation-by-deletion.

FIG. 4H illustrates an invalidation-by-deletion. In FIG. 4H list 402H is, for example, a read-write list having one cache entry 108A. Cache 108B enters list 402H as a read-write entry, and after writing, cache 108A is deleted, resulting in list 402HR1 with only one cache 108B. And in another example, cache 108C enters list 402HR1 with a read-write request. After cache 108C is modified, cache 108B is deleted, resulting in the read-write list 402HR2 with only one entry 108C. Thus, a read-write entry entering a one-entry read-write list always results in a one-entry read-write list.

FIG. 4I illustrates how a list having a read-write entry at the tail, and that tail may be the only entry in the list. In FIG. 4I cache 108B enters read-write list 402I as a read-only entry, and the resulting list 402IR1 has two cache entries 108A and 108B with cache 108A being at the tail in the read-write state and cache 108B at the head in the read-only state. As long as a read-only cache 108 enters the list, the list keeps growing as list 402IR2 and the read-write cache 108A remains at the tail in the read-write state. In list 402IR2, caches 102N, 102C, and 102B are in the read-only state. However, when a cache 108 enters the list as a read-write, the resulting list becomes a one entry list, like list 402IR3 because processor 102M has invalidated stale cache entries (108A–108N) by deleting them.

The deleting scheme illustrated in FIGS. 4G–4I is inherently inefficient because sequentially deleting every entry from the head to the tail to result in list 402IR3 takes a long time. Long lists with entries being deleted can seriously degrade system performance. Another inefficiency also arises, for example, in list 402IR2 when processor 102A seeks to write to its cache 108A. In one prior art embodiment, cache 108A leaves list 402IR2 and re-enters the list as a new entry. Leaving the list poses inefficiency as the list needs to keep track of members entering and leaving. Entering the list as a new entry also suffers the inefficiency of sequential deletion because the processor 102A has to invalidate or delete other stale entries of the list.

In light of the deficiencies of the prior art, there is a need for a system that can minimize the time to invalidate stale cache copies.

SUMMARY OF THE INVENTION

The present invention, advantageous over prior art solutions, improves invalidation times by a factor of nearly two or four as compared to the SCI Standard's sequential invalidation.

The present invention provides a system and a method for updating a cache-sharing list from read-only to read-write in accordance with standard cache coherence protocols. In one embodiment, an updating request is associated with a tail cache entry, and the processor associated with the cache requests the main memory to update the processor's cache line. In response to the request, a copy of the cache line is created and made the head of the list. Thus, there are two cache entry copies in two places in the list. The processor then updates its cache and allows concurrent invalidation of stale cache entries in both directions from head-to-tail (forward) and from tail-to-head (backward).

Two preferred forward-invalidation methods are implemented. In the first (slow) method the list head informs the next-list entry that the next-list entry is to be invalidated. In response the next-list entry informs the head of the identity of the next-list entry's successor, which in turn needs to be invalidated. The next-list entry is then invalidated and the next-list entry's successor becomes the next-list entry (with respect to the list head) and is subjected to the same invalidation process as the previous next-list entry. The process continues until all entries in the list have been invalidated.

In the second (fast) method of forward invalidation, the head first informs the next-list entry that every stale entry in the list is to be invalidated. In response the next-list entry informs the head that a validate completion signal will be returned to the head. The next-list entry is then invalidated and the invalidation signal is forwarded towards the tail where the last invalidated entry sends to the head a confirmation signal that all invalidations have been completed.

In backward invalidation the tail informs the preceding entry that the preceding entry is about to become a tail, and that upon becoming the tail the preceding entry itself needs to be invalidated. The tail is then invalidated and the preceding entry becomes the tail and is subjected to the invalidation process, and so on until all invalidations have been completed.

Because the fast forward invalidation poses a potential deadlock, this invalidation method is used only when deadlock is free; otherwise when potential deadlock is detected the slow method is used even though the slow method takes about twice as long to complete. By having fast forward invalidation and concurrent backward invalidation the overall invalidation time is improved by about four times as compared to slow forward invalidation alone.

BRIEF DESCRIPTION OF THE DRAWINGS

FIG. 8 shows a state-transition table of a cache requester in FIG. 5;

FIG. 9 shows a state-transition table of a memory responder in FIG. 5; and

FIG. 10 shows a state-transition table of a cache responder in FIG. 5.

DETAIL DESCRIPTION OF THE PREFERRED EMBODIMENT

The present invention provides a system and method for updating a cache list entry from the read-only type to the read-write type. After the entry is updated, invalidation of stale cache entries starts concurrently from both ends of the list, i.e., in the directions from head-to-tail and from tail-to-head. The invention is applicable for example when the processor associated with a tail cache entry in a read-only list has obtained read-write permission and seeks to update its cache.

Figure 1:
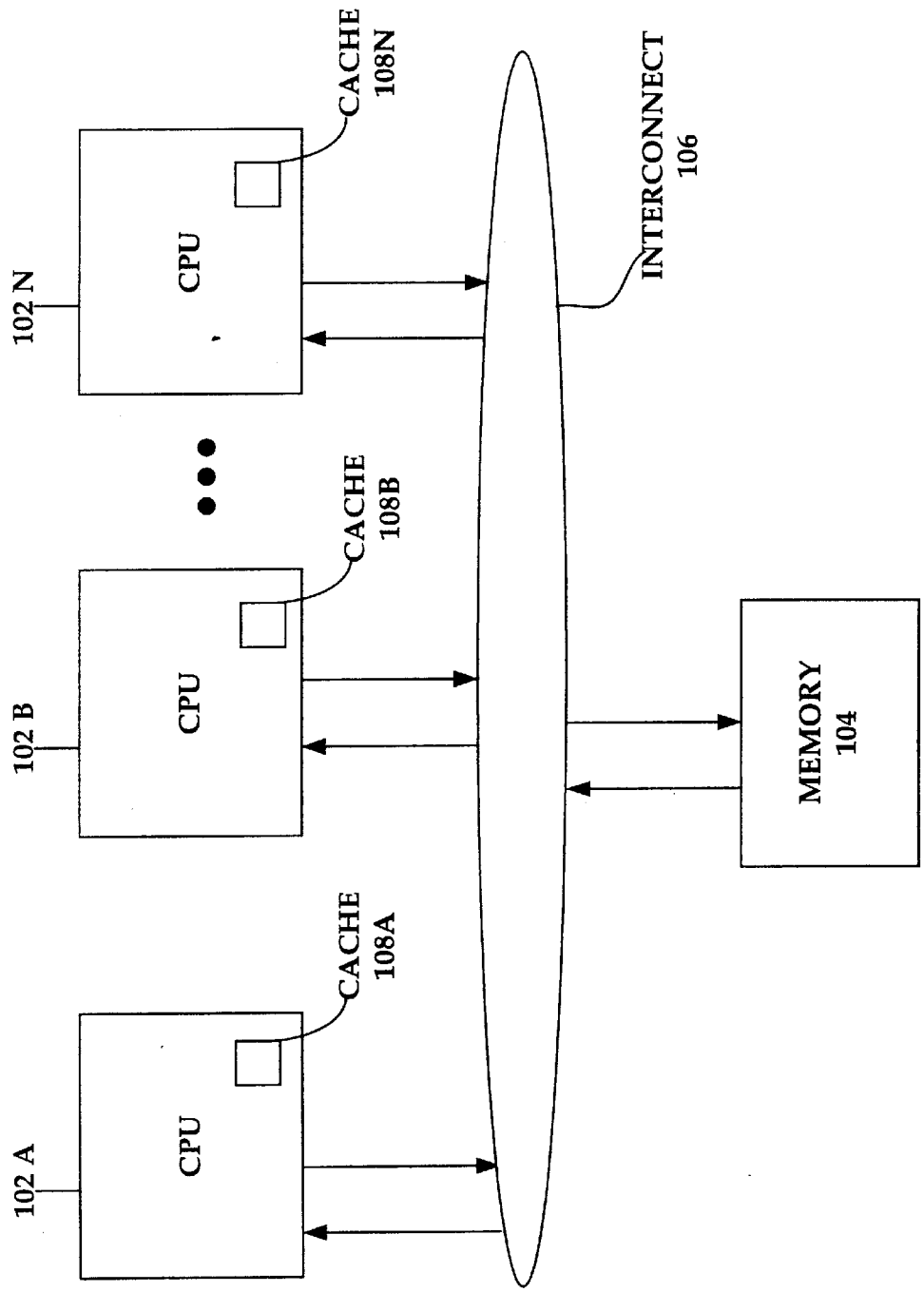
FIG. 1 shows a conventional multi-processor system with a cache memory for each processor.
Figure 2A:
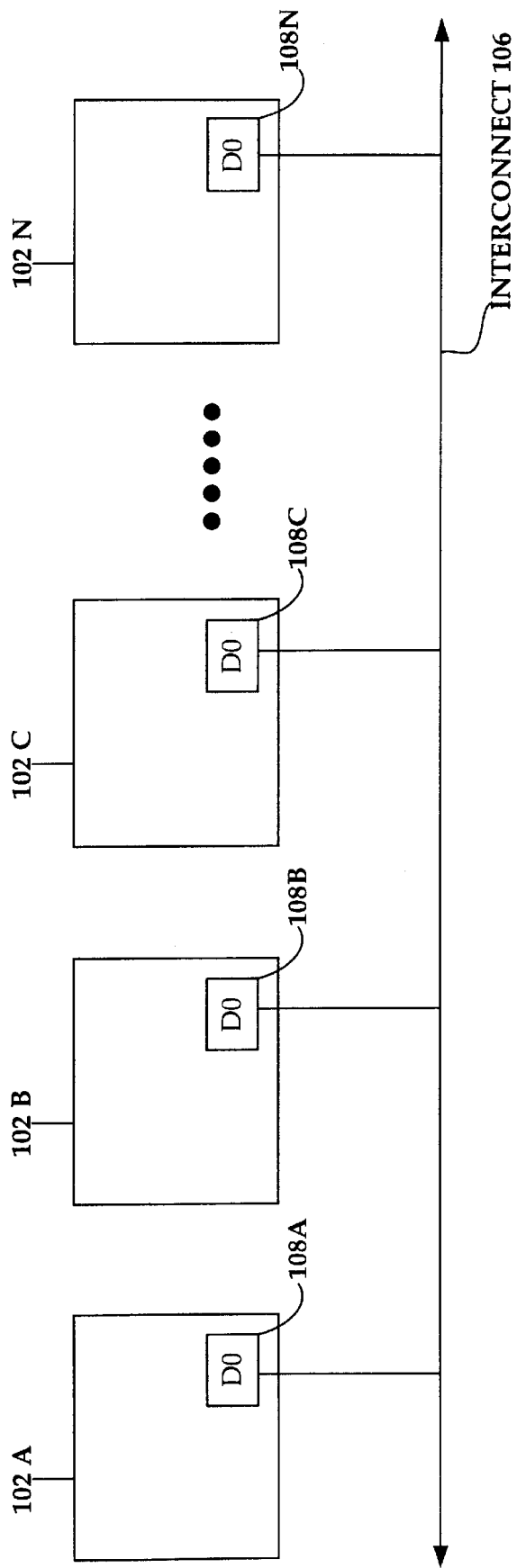
FIG. 2A illustrates all processors' cache lines being valid.
Figure 2B:
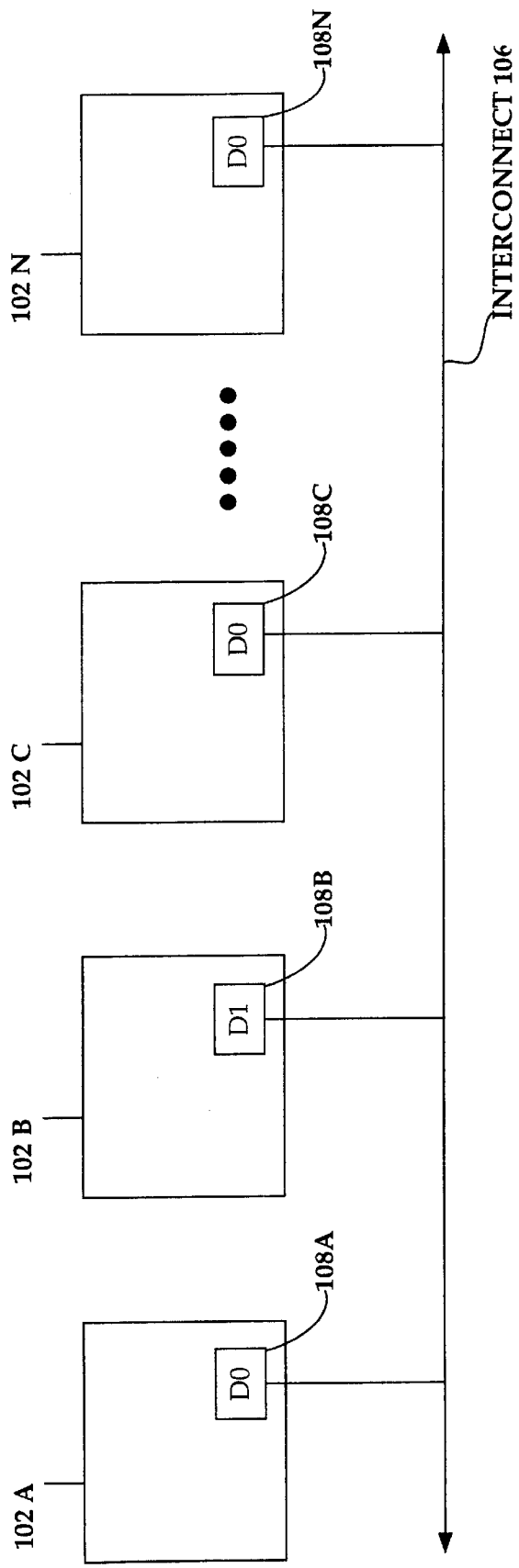
FIG. 2B shows one cache line being valid while others are invalidated.
Figure 3:
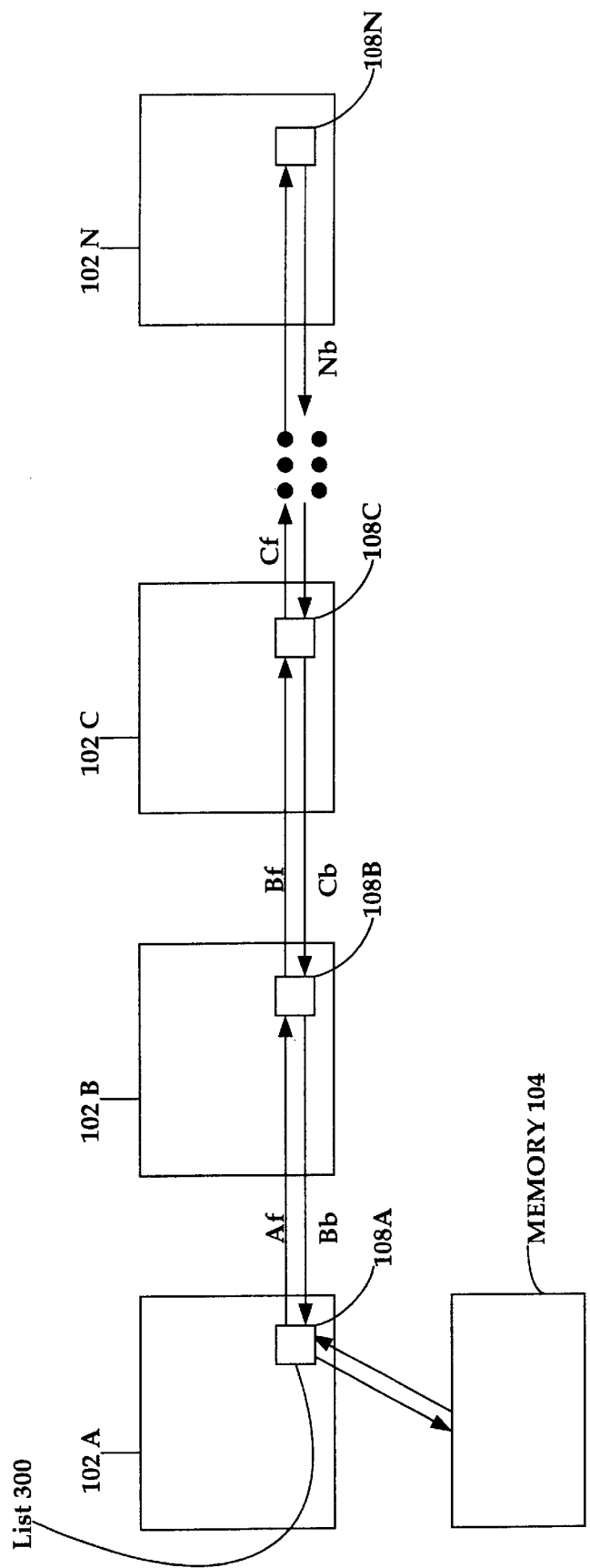
FIG. 3 shows a cache-sharing double-linked list.
Figure 4A:
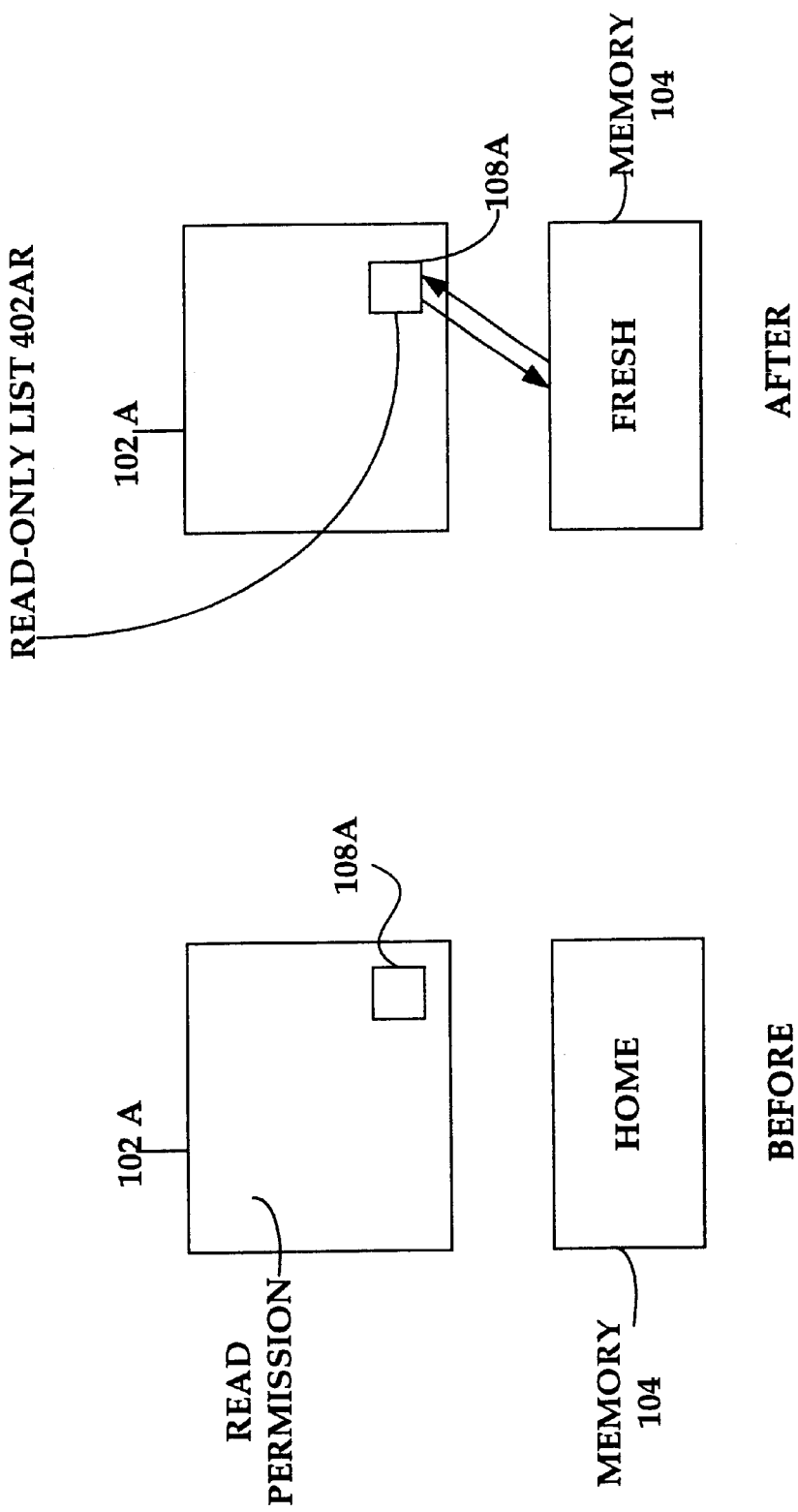
FIG. 4A illustrates creation of a read-only shared list.
Figure 4B:
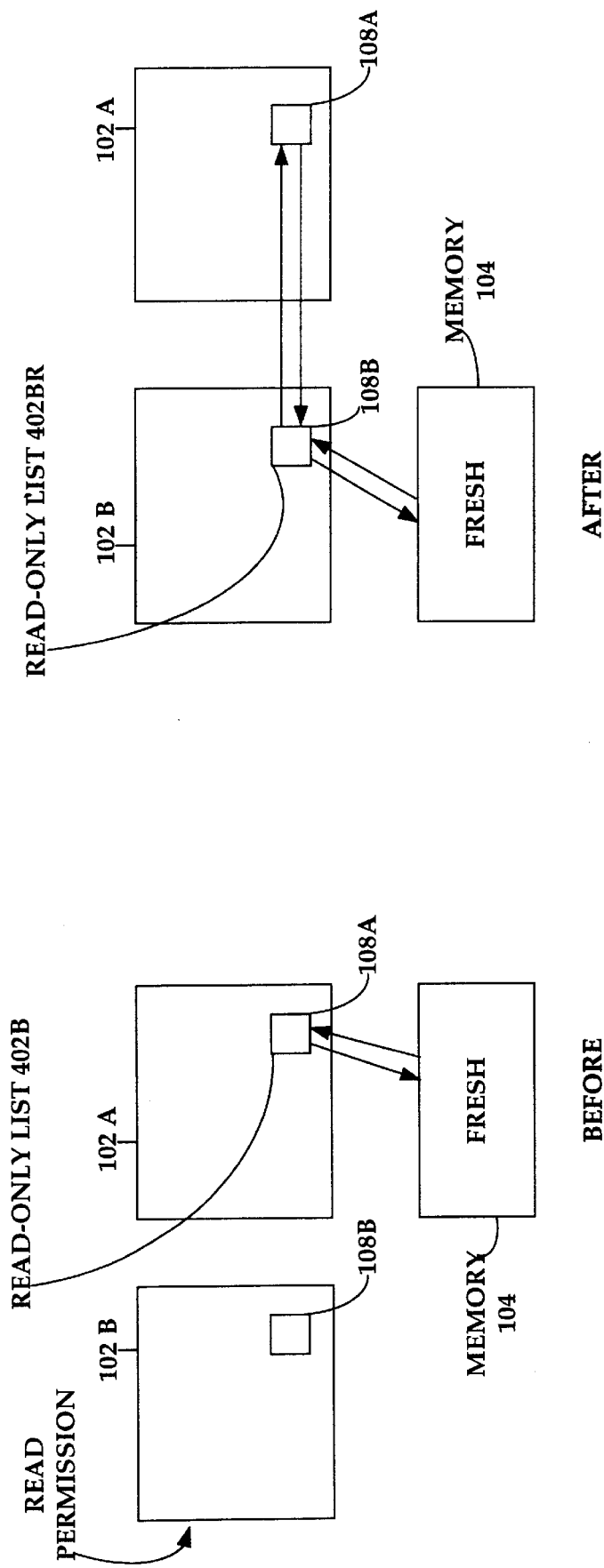
FIG. 4B illustrates a cache entry entering a shared read-only list.
Figure 4C:
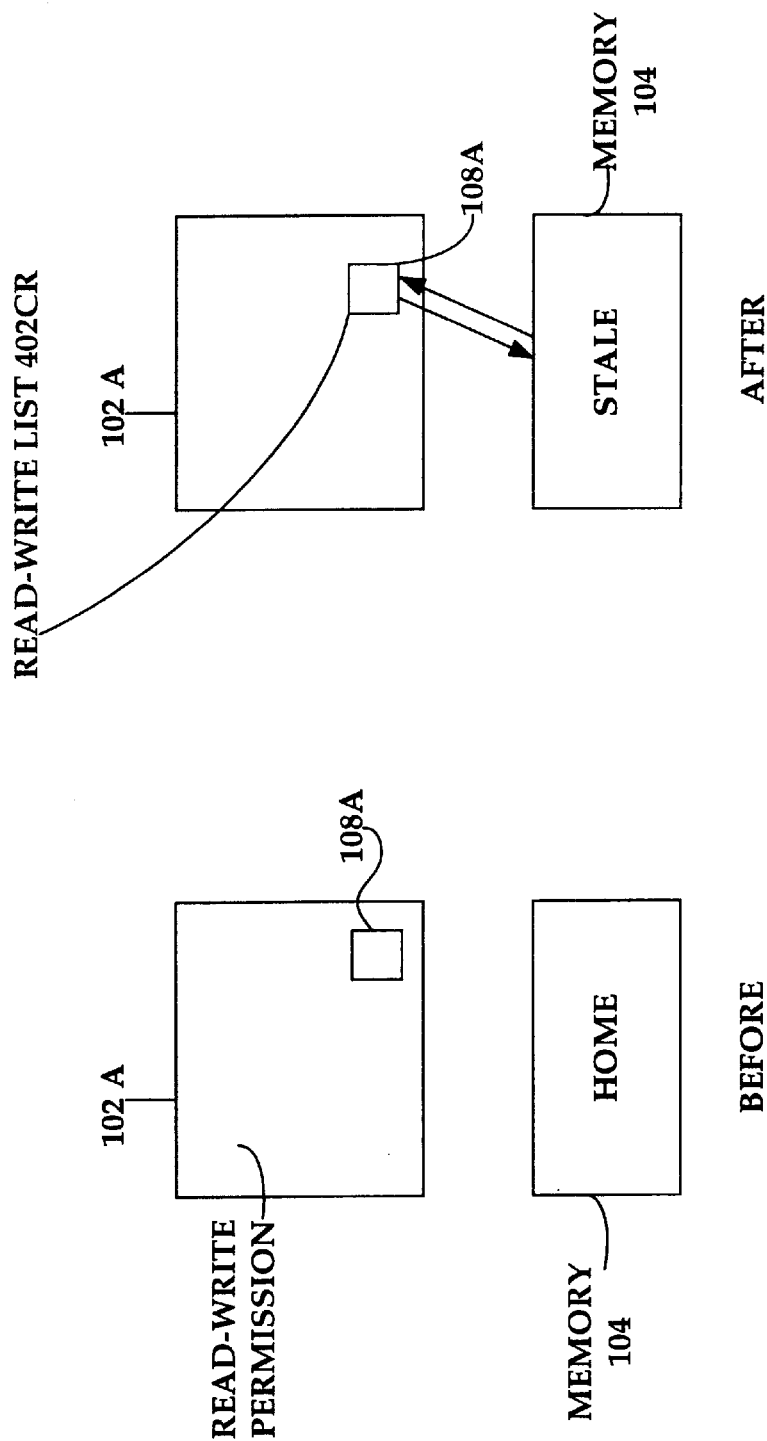
FIG. 4C illustrates creation of a read-write shared list.
Figure 4D:
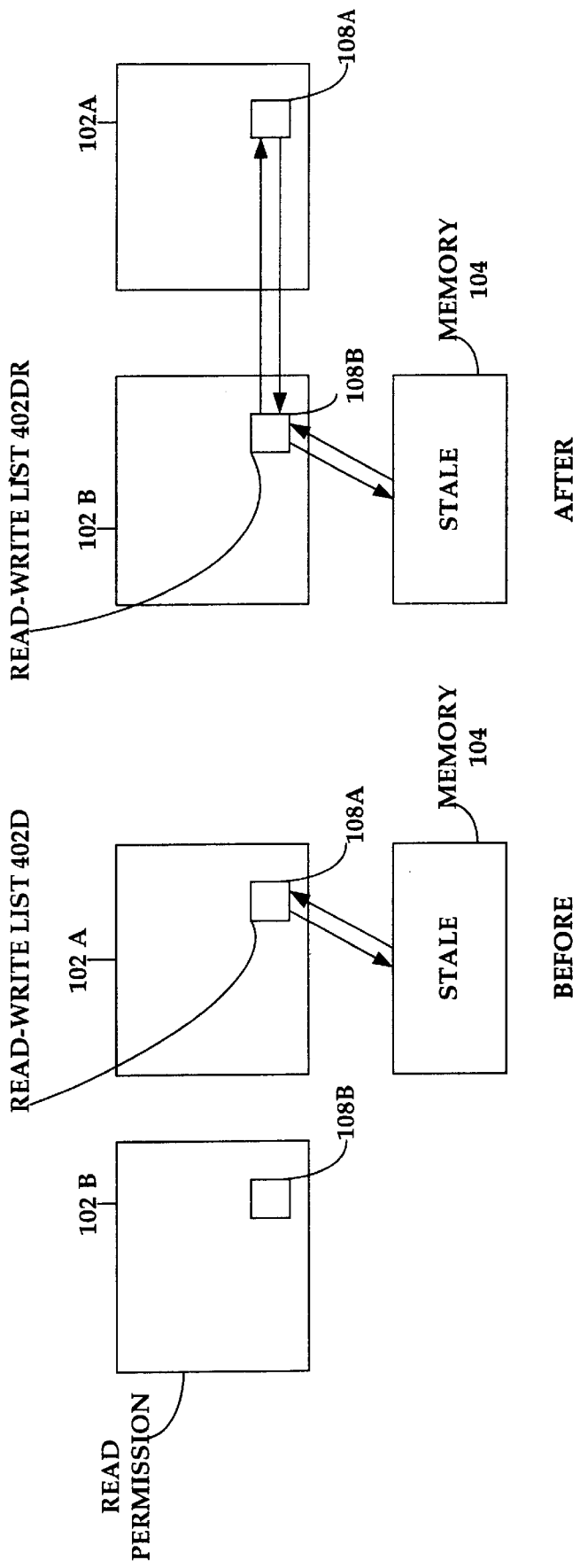
FIG. 4D shows a read-permission entry entering a read-write list.
Figure 4E:
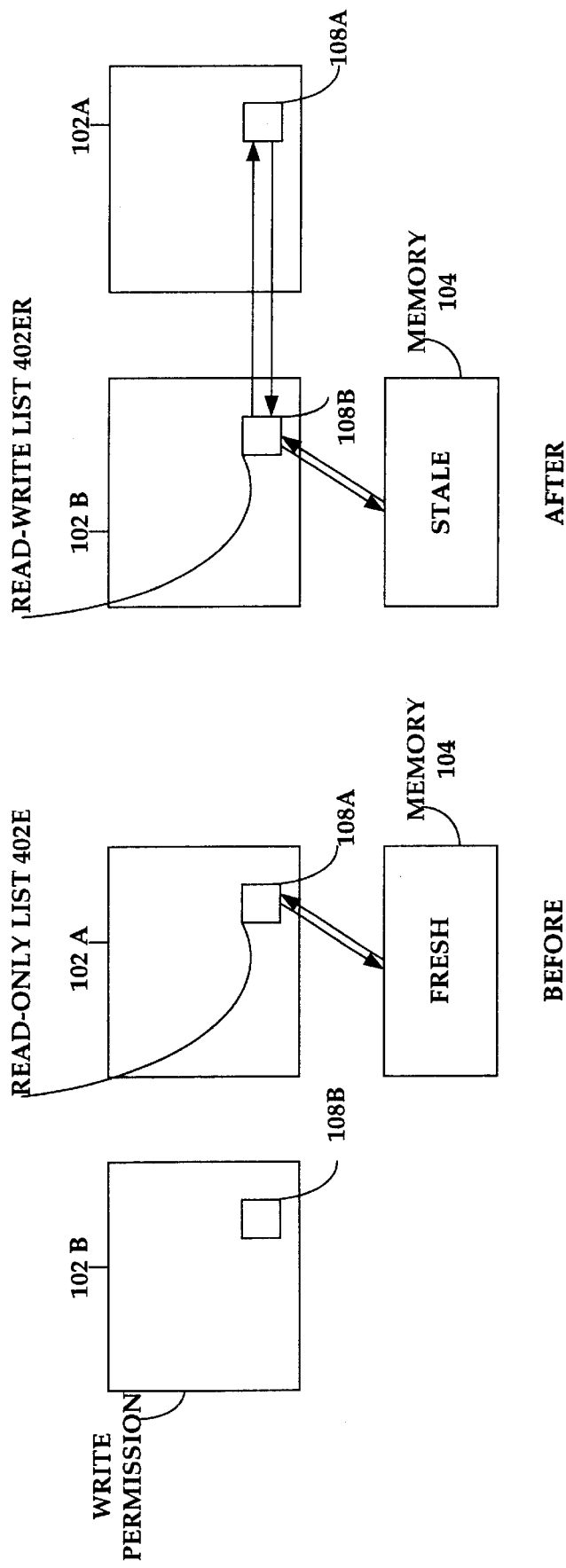
FIG. 4E shows a write-permission entry entering a read-only list.
Figure 4F:
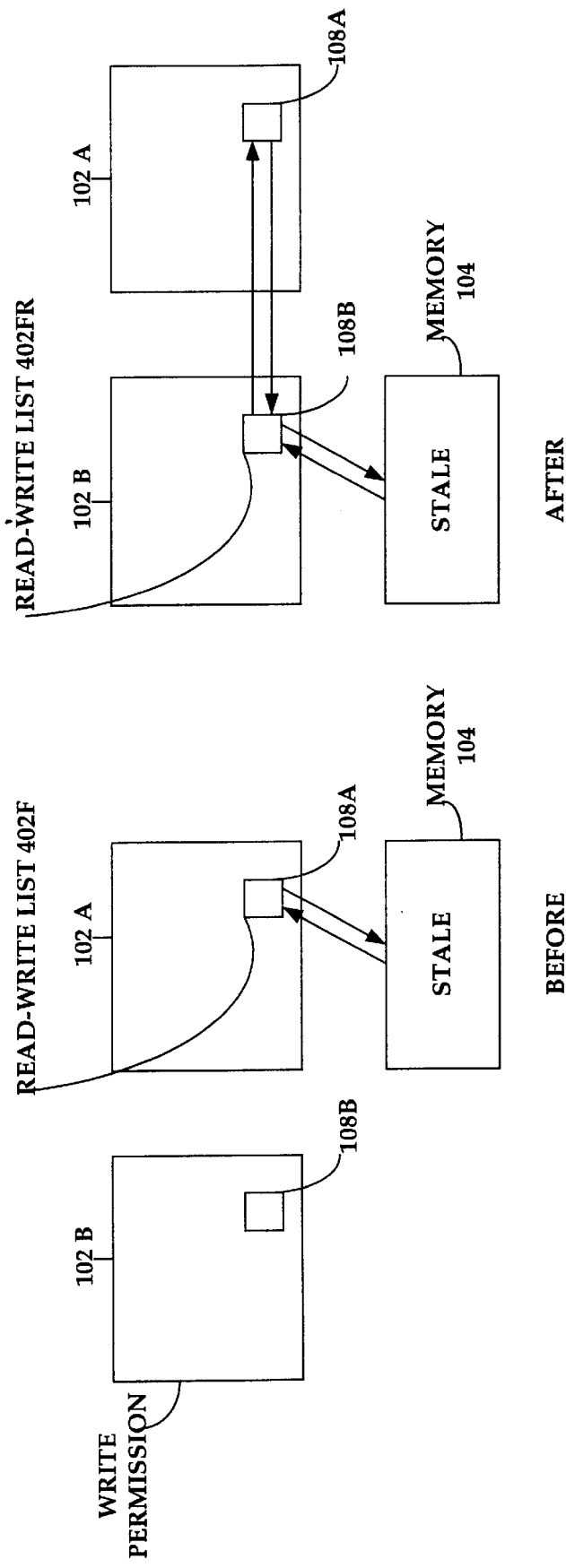
FIG. 4F shows a write-permission entry entering a read-write list.
Figure 4G:
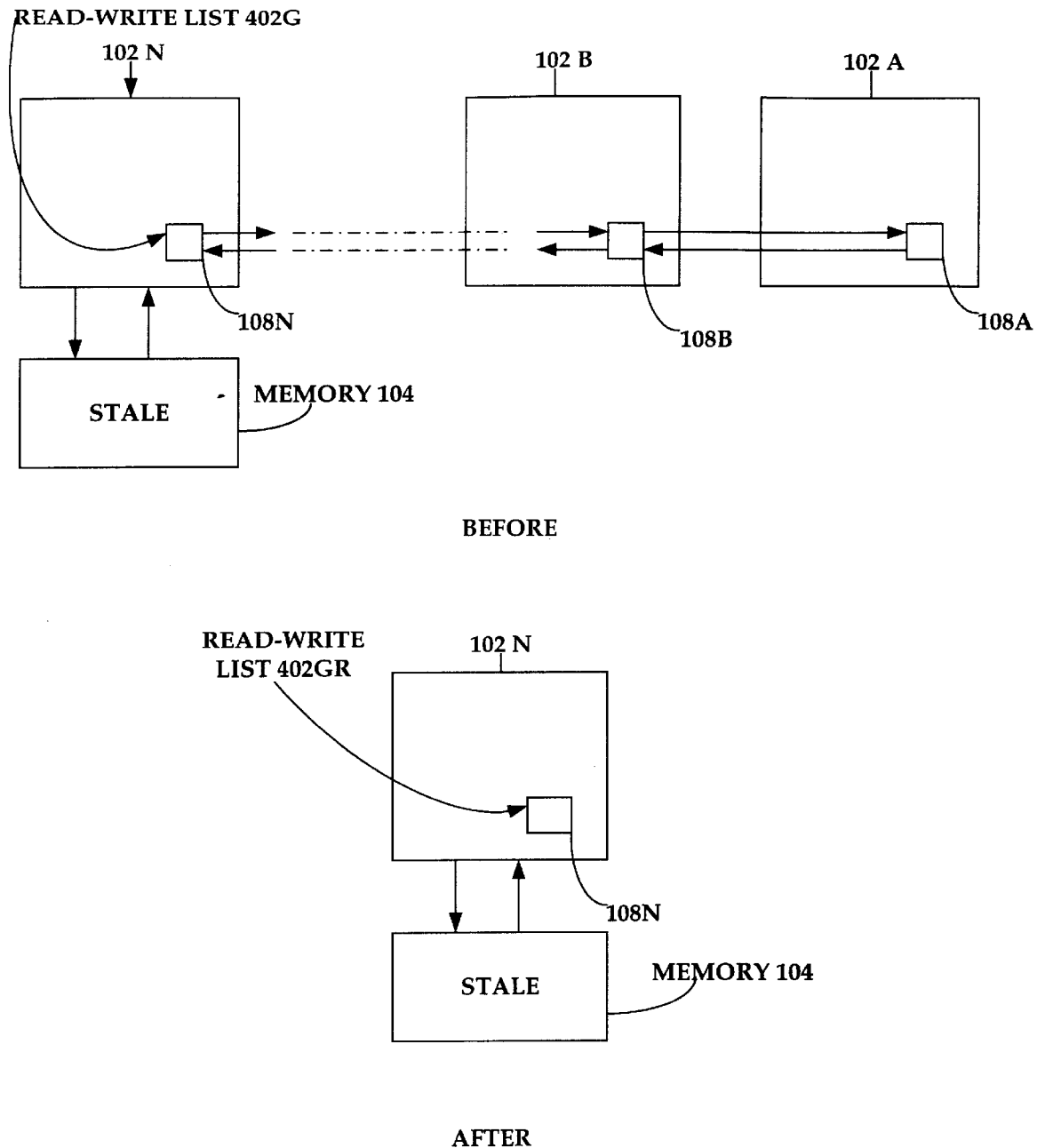
FIG. 4G shows invalidated entries being deleted.
Figure 4H:
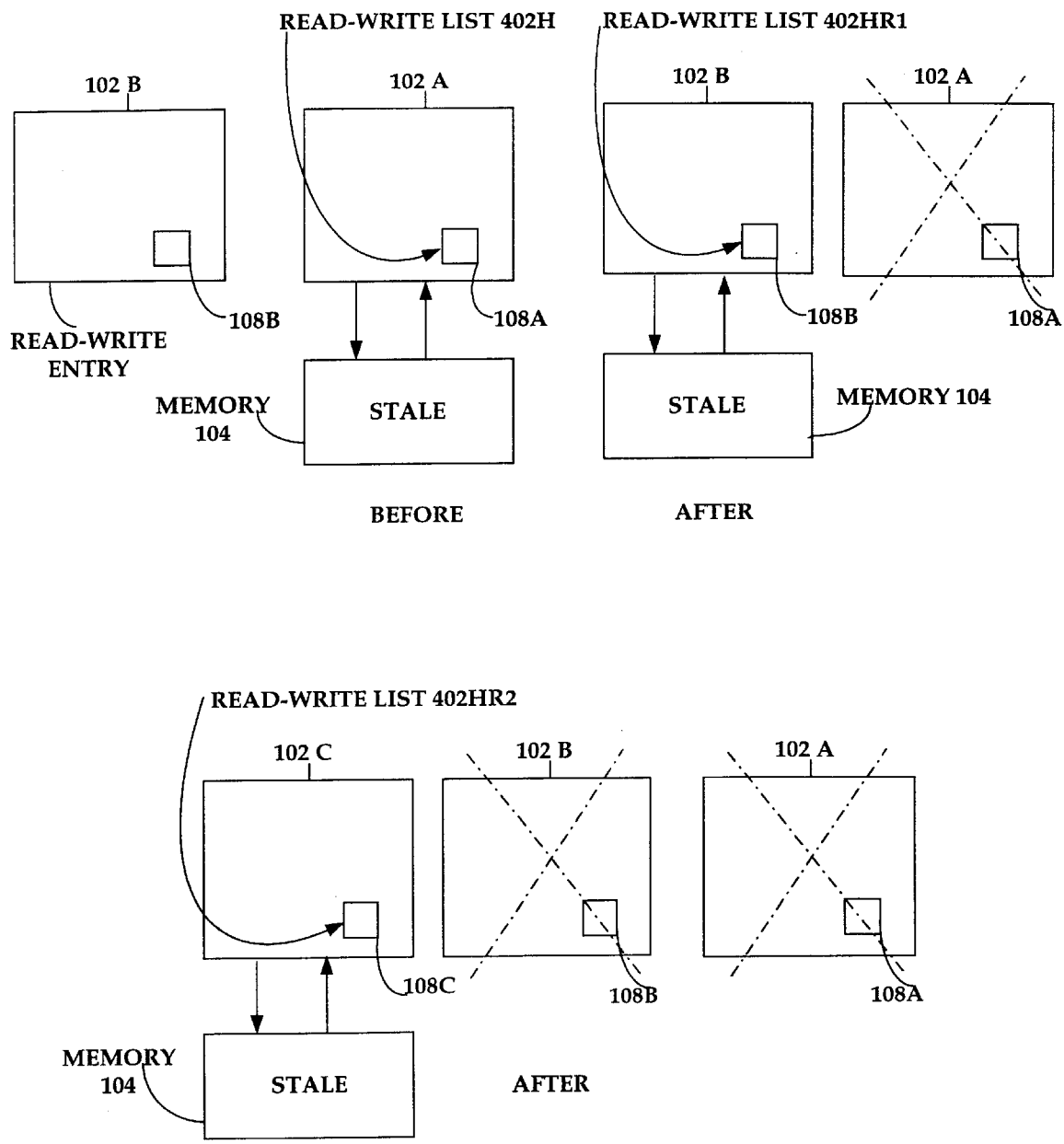
FIG. 4H illustrates a read-write entry joining a read-write list, resulting in a one-member list.
Figure 4I:
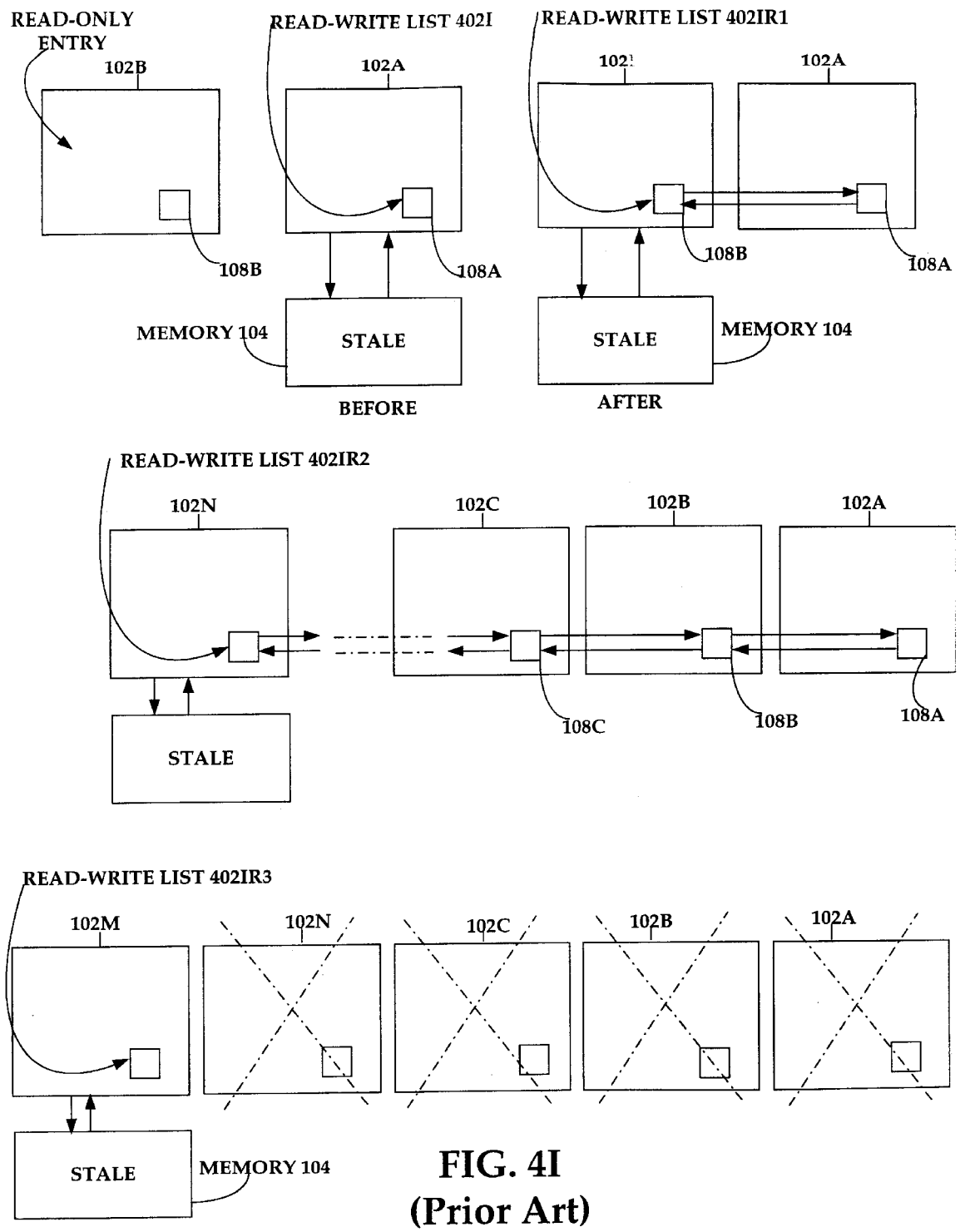
FIG. 4I illustrates a growing list and a one-member list after invalidation by deletion.
Figure 5:
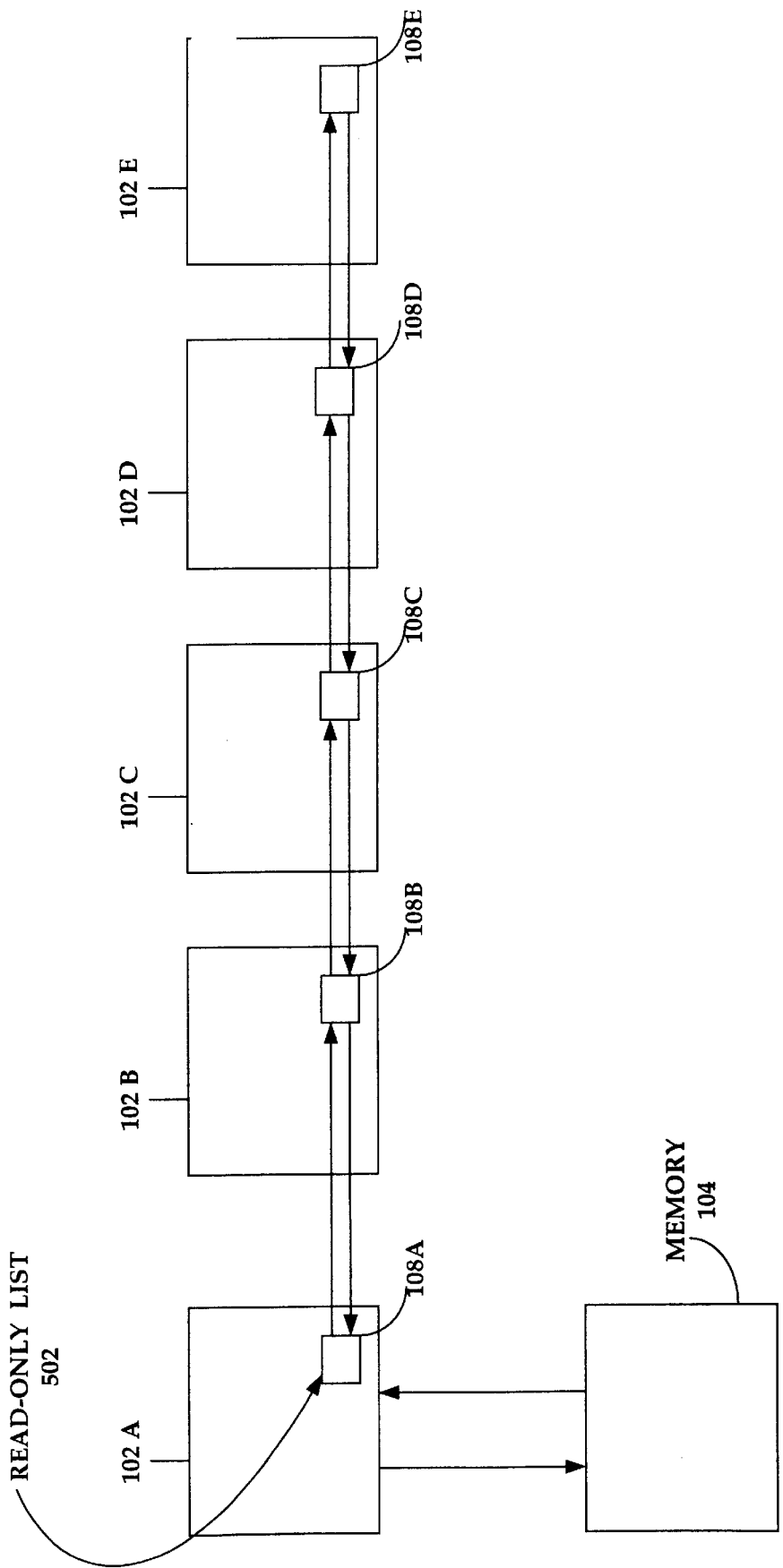
FIG. 5 shows an operation of the invention in which a list 502 requests that its tail cache entry be updated.

FIG. 5 shows an example of read-only list 502 having cache entries 108A, 108B, 108C, 108D, and 108E, and processor 102E seeks to update its cache 108E. In accordance with the invention, when processor 102E is about to update its cache 108E, cache 108E remains in the list, and a second copy of cache 108E is created and made the head of the list. The invention is advantageous over prior art solutions in which cache 108E would be deleted from, then reenter, list 502.

Figure 6A:
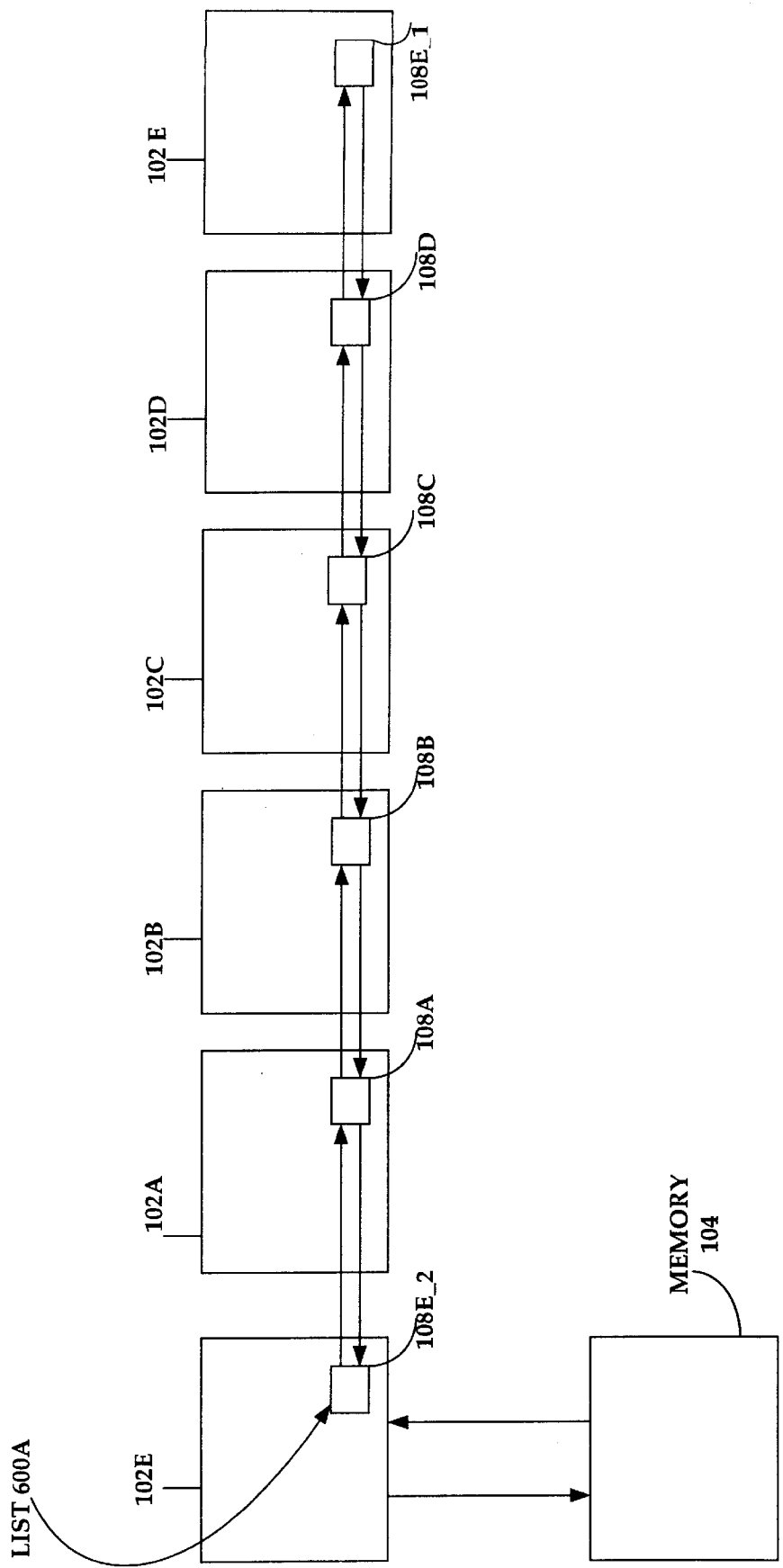
FIG. 6A shows two copies of a cache in two places in the list.

FIG. 6A shows a list 600A with two copies 108E_1 and 108E_2 of cache 108E. Cache 108E_2 is the head, while cache 108E_1 is the tail, of the list.

Figure 6B:
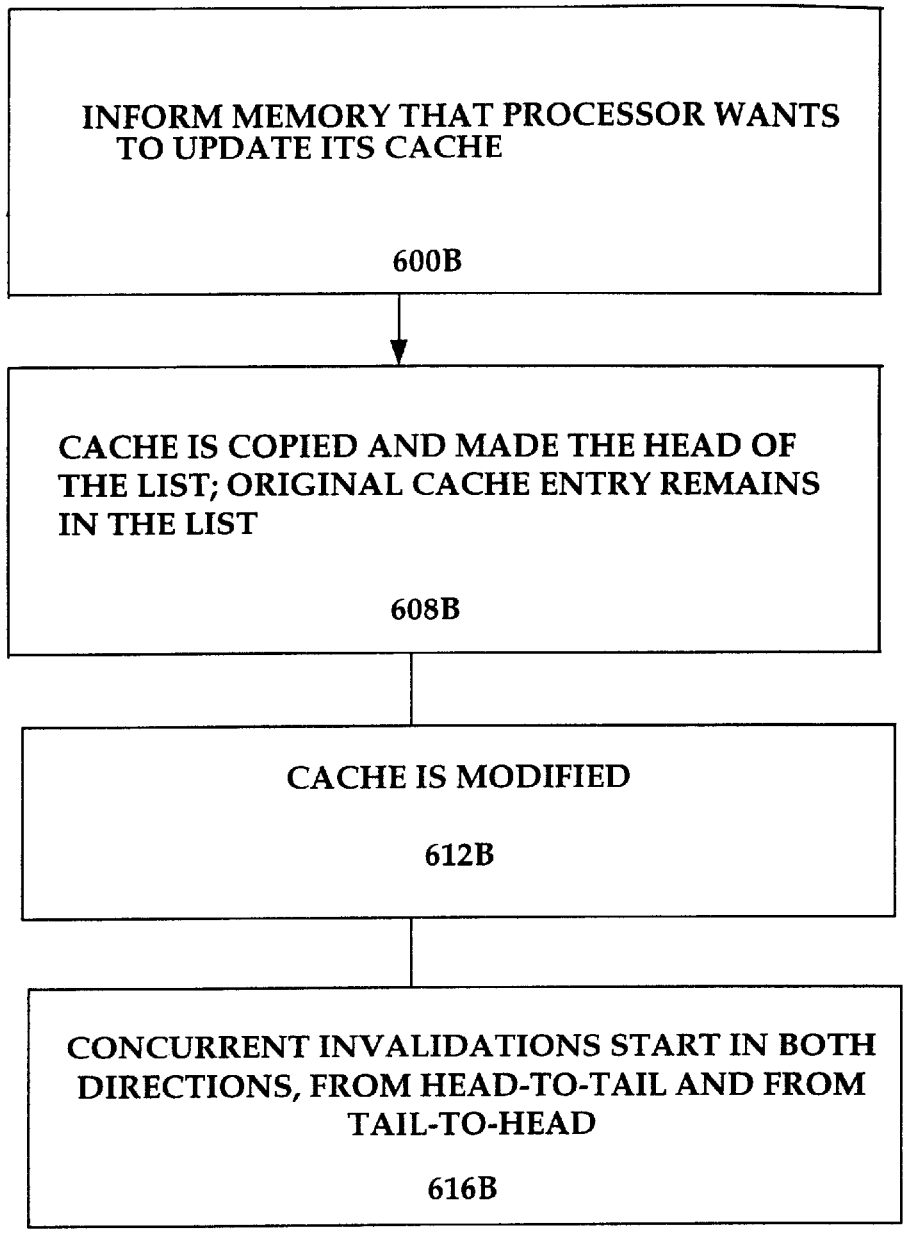
FIG. 6B shows a method in accordance with the present invention to update an entry.

FIG. 6B shows a method of the present invention used to transform list 502 of FIG. 5 to list 600A of FIG. 6A. At step 600B, processor 102E informs memory 104 that processor 102E seeks to update its cache 108E. At step 608B a second copy of cache 108 is created. Cache 108E, or now 108E_1, remains as the tail of the list while the second copy, or cache 108E_2, is made the head of the list. At step 612B cache 108E_2 is updated and at step 616B invalidation of stale entries (cache 108B, 108C, 108D, and 108E_1) starts concurrently from head to tail and from tail to head.

Figure 6C:
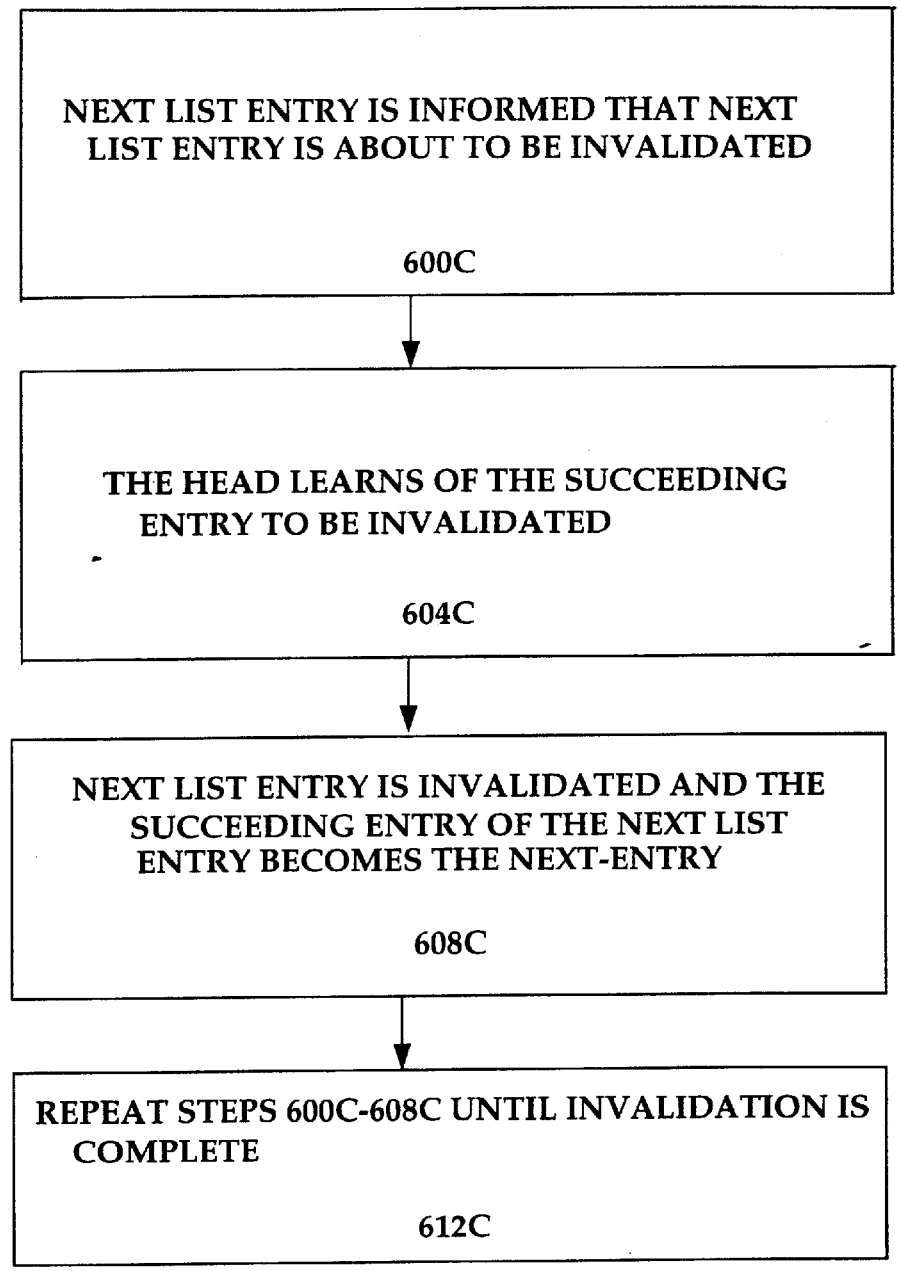
FIG. 6C. is a flowchart showing steps of a first embodiment to invalidate a list of FIG. 6A.

FIG. 6C illustrates a first method for invalidating list 600A of FIG. 6A in the direction from head to tail. At step 600C cache 108A is informed that it is about to be invalidated. At step 604C cache 108A informs the head 102E_1 that cache 108B (successor of cache 108A) is the next to be invalidated, and at step 608C cache 108A is invalidated. In the invalidation by deletion, cache 108A is deleted from the list. Step 612C repeats steps 600C–608C to other stale cache entries (caches 108B, 108C, 108D, and 108E_1 in the list chain) until all invalidation is complete.

Figure 6D:
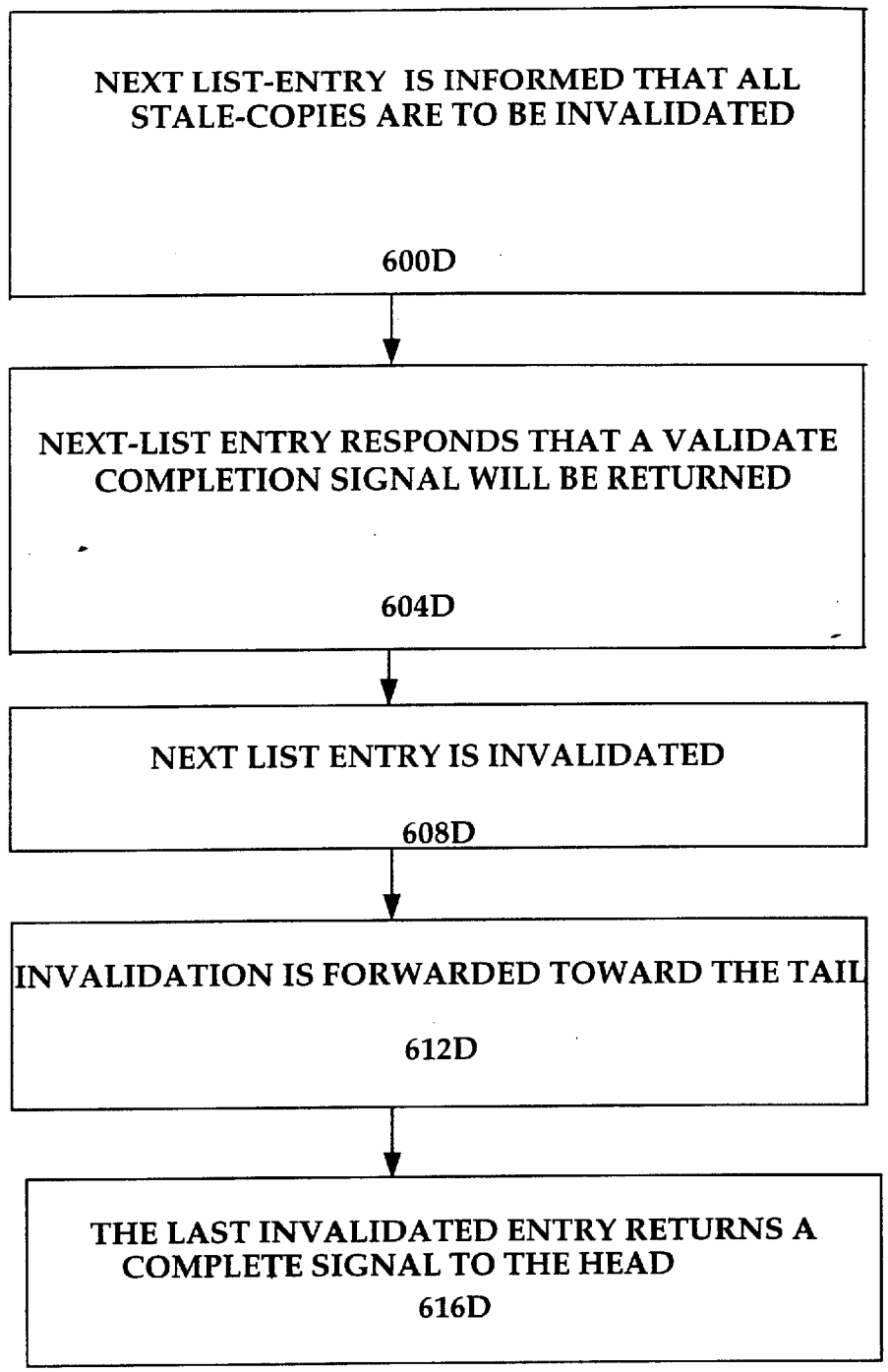
FIG. 6D is a flowchart showing steps of a second embodiment to invalidate a list of FIG. 6A.

FIG. 6D illustrates a second method for invalidating the list 600A of FIG. 6A, also in the direction from head to tail. At step 600D next list entry 108A is informed that all stale cache entries are to be invalidated. At step 604D cache 108A responds to cache 108E_2 that once all stale cache entries are invalidated a completion signal will be returned to cache 108E_2. At step 608D cache entry 108A is invalidated, and invalidation is forwarded to cache 108B, 108C, and eventually to the tail 108E_1 at step 612D. At step 616D the last invalidated copy (cache 108E_1) sends a completion signal to head 108E_2 indicating that all entries have been invalidated.

Figure 6E:
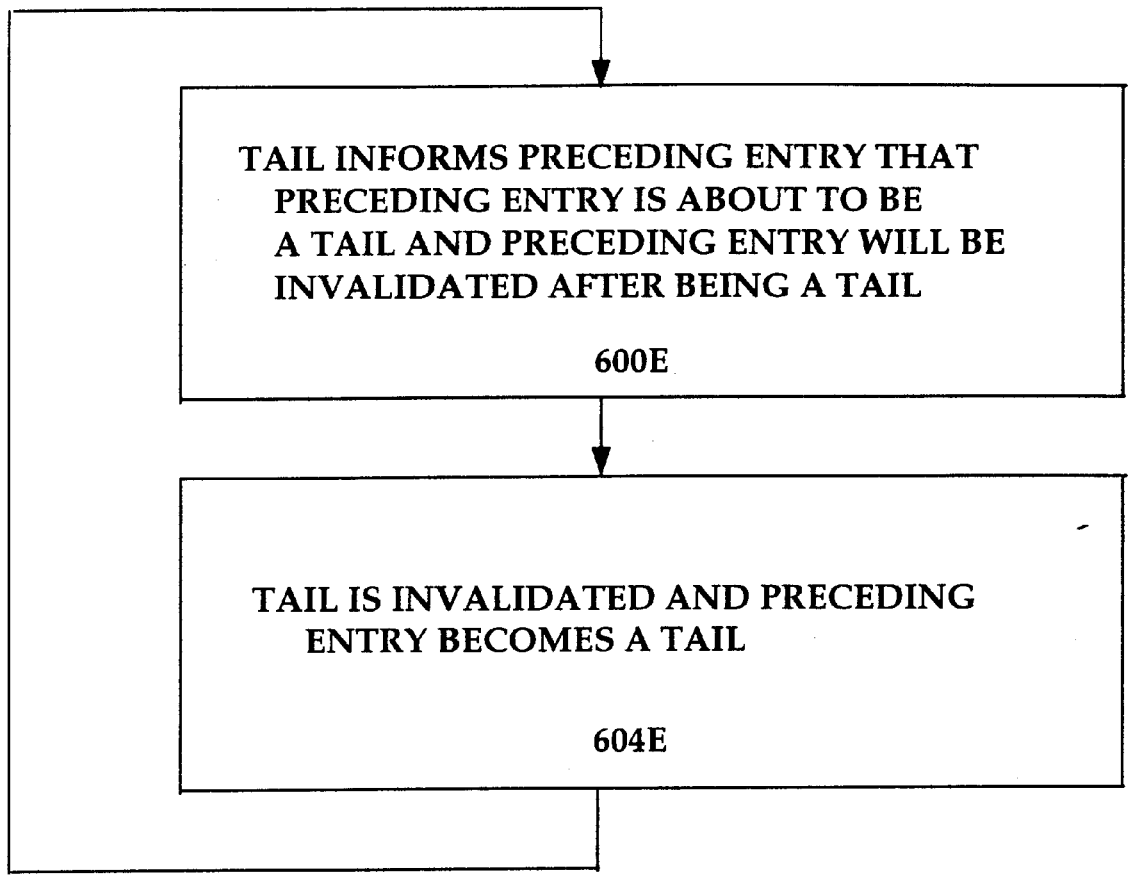
FIG. 6E is a flowchart showing steps of invalidating stale entries from tail-to-head.

FIG. 6E shows an invalidation method in the direction from tail to head. At step 600E the tail (cache 108E_1 of list 600A in FIG. 6A) informs its preceding entry (cache 108D) that cache 108D is about to become a tail and that after becoming the tail, cache 108D as in turn needs to be invalidated. At step 604E the tail 108E_1 is invalidated and leaves cache 108D as the tail. The method then returns to step 600E with cache 108D as a tail, and continues until all stale entries (108C, 108B, and 108A) have been invalidated.

The head-to-tail invalidation method of FIG. 6D poses a potential deadlock because an incoming invalidation request completion (from cache 108B to cache 108C, or cache 108C to cache 108D, etc.) is dependent on outgoing invalidate request completions (from cache 108E_1 to cache 108E_2). However, the possible deadlock is detectable. Therefore, when deadlock is clear the head-to-tail deletion method of FIG. 6D is implemented, but when deadlock potential is detected the invalidation method of FIG. 6C is implemented even though this method takes twice as long to complete compared to the method of FIG. 6D.

Figure 7:
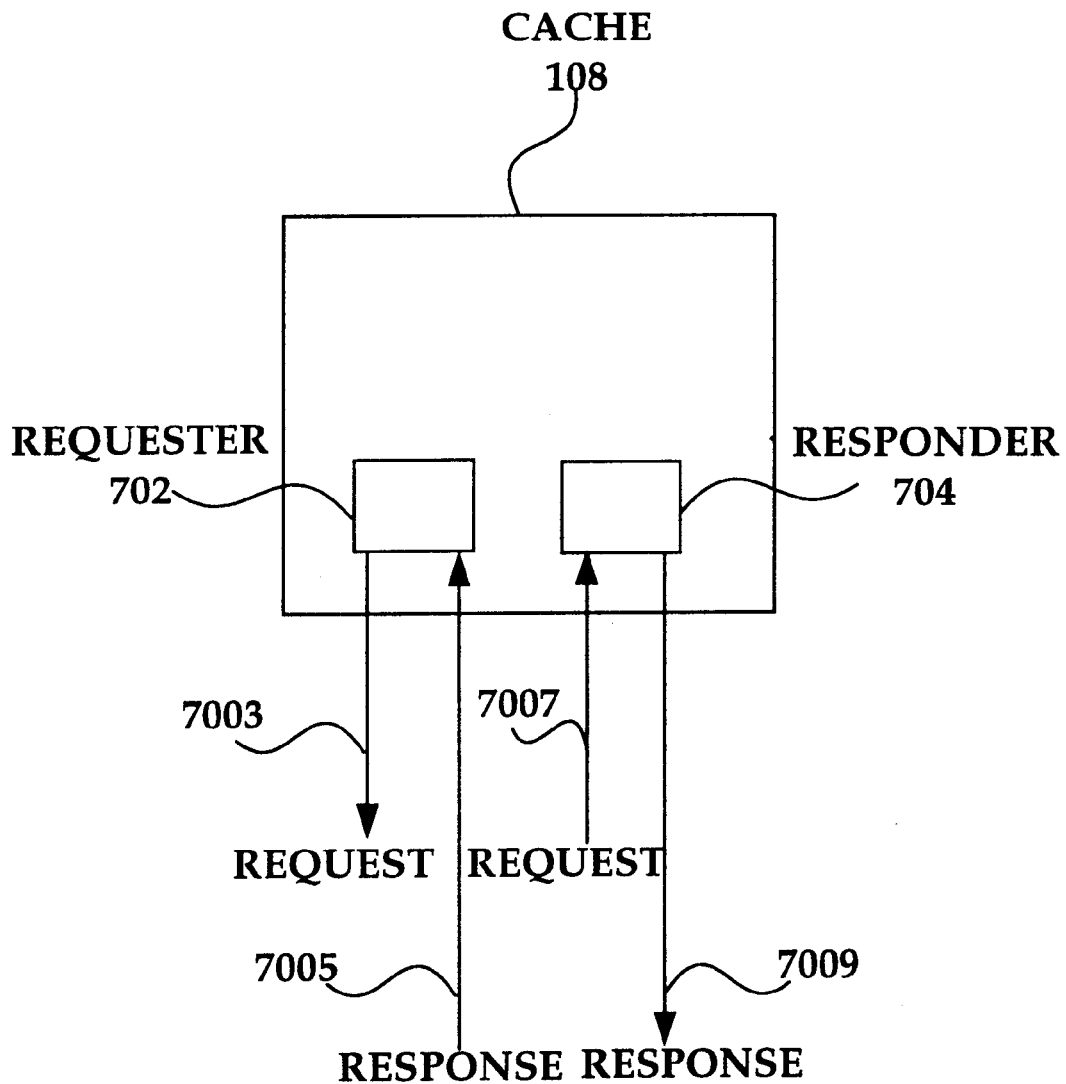
FIG. 7 shows a cache in accordance with the present invention.

FIG. 7 shows, in relevant parts, a cache 108 in accordance with the invention that includes a requester 702 and a responder 704. Requester 702, via a Request on line 7003, initiates an action desired by a processor 102 to another processor 102 or to memory 104, and receives a Response on line 7005. Responder 704 receives either from a processor 102 or memory 104 a Request on line 7007, and, via a Response on line 7009, responds to the action requested by a requester 702. In the preferred embodiment memory 104 includes a responder 704, but does not include a requester 702. Row 1a shows an action taken by cache requester 702 when memory 104 was in the fresh ("F") state while row 1b shows the same action taken by cache requester 702 when memory 104 was in a stale state. The suffixes "F" and "S" correspond to the fresh state and FIG. 8 shows a state-transition table of cache requester 702 of cache 108E in FIG. 5. In row 1a requester 702, associated with a tail cache 108E, has a "TAIL" old state. Cache 108E then generates an "mReadOwned" request, that is, cache 108E requests memory ("m") 104 for a read-write ("Owned") permission. Cache 108E then receives a "DONE$_{13}$ F" response and the identification of the next ("IDnext") cache entry (cache 108A) for cache 108E to point to. "DONE" indicates that cache 108E is granted the request, and "F" indicates that memory 104 was in the read-only state. Cache 108E then changes state to "ENDS_TAIL_F," i.e., cache 108E now has two copies 108E_1 and 108E_2, and copy 108E_1 remains as a tail ("TAIL"), but both copies 108E_1 and 108E_2 are at both ends ("ENDS"), the tail end and the head end, of the list.

Row 1b is the same as row 1a, except that row 1b deals with the situation in which memory 104 was in the read-write state ("S").

In rows 2a and 2b requester 702, in response to an action taken in row 1a, has an "ENDS_TAIL_F" old state and generates a "cMarkPost" request. A "c" indicates that requester 702 asks the next cache entry 108 (cache 108A) to become the tail and then delete itself ("MarkPost");

In row 2a requester 702 receives a "DONE" response and changes state to "HEADd_INVAL_F," indicating that cache 108E_2 is the only copy of cache 108E and is the head ("HEAD") of a read-write ("d") list. Consequently, invalidation ("INVAL") of stale cache copies occurs as appropriate.

In row 2b requester 702 receives a "BUSY" response as the next cache entry is busy and cannot perform the request, that is, it cannot invalidate itself. Requester 702 thus changes state to "ENDS_INVAL_F," that is, requester 702 is still at the end and needs to be invalidated.

Rows 3a and 3b are the same as rows 2a and 2b respectively, except that rows 3a and 3b deal with the situations in which memory 104 was previously in the read-write state.

In rows 4a, 4b, and 4c requester 702, in response to an action taken in rows 2b, 4a, and 4c, has an "ENDS_INVAL_F" state. Requester 702 then generates a "cMarkInval_F" request to ask the next cache ("c") entry 108 to invalidate ("MarkInval") itself. An "F" indicates that memory 104 was previously in the read-only state.

In rows 4a, requester 702 receives a "MORE" response when there is at least one other cache entry 108 to be invalidated and when the next cache entry 108 is not the second copy (cache 108E_1) of cache 108E. Requester 702 remains the "ENDS_INVAL_F" state, but continues with a revised next-cached identifier provided by a cache that has been invalidated.

In row 4b, where the next cache entry 108 is the second copy (cache 108E_1) of cache 108E ("IDreq"), requester 702 also returns a "MORE" response, but changes state to "ONLYd," which indicates that, after cache 108E_1 is invalidated, cache 108E_2 is the only ("ONLY") copy of cache 108E in a read-write ("d") list.

In row 4c, requester 702 receives a "BUSY" response, and thus remains the "ENDS_INVAL_S" state and will continue to retry the "cMarkInval_F" request.

Rows 5a, 5b, and 5c are the same as rows 4a, 4b, and 4c, respectively, except that rows 5a–5c deal with the situations in which memory 104 was previously in the read-write state ("S").

In rows 6a, 6b, and 6c requester 702, in response to an action taken in rows 2a, 6a, and 6c, has a "HEADd_INVAL_F" old state. Requester 702 associated with cache 108E (or 108E_2 in FIG. 6) which is the head ("HEAD") of a read-write ("d") list. Cache 108E then generates a "cMarkInval_F" request to ask the next cache ("c") entry to invalidate ("MarkInval") itself. An "F" indicates memory 104 was previously in a read-only state.

In row 6a cache requester 702 receives a "MORE" response and the identification of the successor of the next ("IDnext") cache entry. Requester 702 thus remains the "HEADd_INVAL_F" state and continues to invalidate other cache entries in the list.

In row 6b cache requester 702 receives a "DONE" response, and changes state to "ONLYd."

In row 6c cache requester 702 receives a "BUSY" response, and remains the "HEADd_INVAL_F" state.

Rows 7a, 7b, and 7c are the same as rows 6a, 6b, and 6c, respectively, except that rows 7a–7c deal with the situations in which memory 104 was previously in the read-write state.

Rows 8a and 8b shows requester 702 associated with a cache 108 that was initially in the middle of the list, has become a tail, then generates an "mMarkPost" request to memory ("m") 104 to delete the cache 108 itself. In row 8a memory 104 acknowledges the request by generating a "DONE" response which cache 108 receives. Cache 108 then changes state to "INVAL." In row 8b cache 108 receives a "BUSY" response, and thus remains the "LAST_TAIL" state.

Row 9 shows requester 702, in response to an action taken in rows 4b, 5b, 6b, and 7b, has an "ONLYd" old state, which, being a stable state, generates no further request.

FIG. 9 shows a state-transition table of a memory responder 704M of memory 104. States of responder 704M during the creation of list 500A are not shown. In row 1 memory 104 points to the head ("IDhead") of the list, and responder 704M has a "FRESH" state for a read-only list. Responder 704M then receives an "mReadOwned" request; thus changes state to "STALE," points to the requesting ("IDreq") cache entry (cache 108E_2 of FIG. 600A), and returns a "DONE_F" response.

Row 2 is the same as row 1 except that the list, instead of being a read-only list, is a read-write list. Memory 104 thus has a "STALE" old state and returns a "DONE_S" response.

FIG. 10 shows a state-transition table of a cache responder 704 of a cache entry 108 in FIGS. 5 and 6A.

Rows 1a and 1b show that responder 704 receives a "cMarkedPost" request from a tail entry requesting that responder 704 become a tail entry and then invalidate itself. In row 1a responder 704 becomes a tail, returns a "DONE" response, and changes state to "LAST_TAIL."

In row 1b responder 704 cannot become a tail, ignores the request, returns a "BUSY" response, and therefore remains the same state.

In row 2a responder 704 having an "ENDS_INVAL_F" old state, that is, responder 704 is associated with a cache being at both ends of the list (cache 108E_1 and 108E_2). An "F" indicates that memory 104 was previously in a read-only state. Responder 704 then receives a "cMarkInval_F" request to invalidate itself. An "F" in "cMarkInval_F" indicates that responder 704 is associated with the tail, i.e, cache copy 108E_1. Consequently, request "cMarkInval_F" comes from a preceding entry of tail 108E_1, or cache 108D. Copy 108E_1, after invalidating itself, is deleted from the list. Responder 704 is now associated with only cache copy 108E_2, which is the head of the list. Therefore, responder 704 changes state to "HEADd_INVAL_F" and returns a "DONE" response.

Row 2b is the same as row 2a, except that rows 2b deals with the situations in which memory 104 was previously in a read-write ("S") state.

In row 3a responder 704 also has an "ENDS_INVAL_F" old state, but receives a "cMarkInval_S" request to delete itself. An "S" in "cMarkInval_S" indicates that responder 704 is associated with the head copy 108E_2. In this case responder 704 ignores the invalidation request until after all stale cache copies 108A, 108B, 108C, 108D, and 108E_1 have been invalidated.

Row 3b is the same as row 3a except that row 3b deals with the situations in which memory 104 was previously in the read-write ("S") state.

In row 4a responder 704 has a "CORE," state, i.e., it is in the middle of the list. Responder 704 then receives a "cMarkInval_F" request to invalidate itself. Responder 704 changes state to "INVAL," i.e., invalidates itself, and returns a "DONE" response together with the identification of the next list entry ("IDnext") to be invalidated.

Row 4b is the same as row 4a except that row 4b deals with the situations in which memory 104 was in the read-write ("S") state.

In row 5a responder 704 is associated with the head copy 108E_2 and copy 108E_1 has been deleted from the list. Responder 704 then receives a "cMarkInval_S" to delete itself. Responder 704 returns a "BUSY" response to ignore the request until after stale cache copies 108A, 108B, 108C, and 108D have been invalidated. Responder 704 thus remains the same state "HEAD_INVAL_F."

Row 6a is the same as row 6b except that row 6b deals with the situations in which memory 104 was previously in the read-write state.

The present invention has been explained with reference to various preferred embodiments. Other embodiments will be apparent to those skilled in the art after reading this disclosure. For example, the present invention may be implemented in either software or hardware and any implementation of lists can utilize the invention. Additionally, the invention may effectively be used in combination with multi-processor systems other than those described in accordance with the preferred embodiments. Therefore, these and other variations upon the preferred embodiment are intended to be covered by the following claims.

What is claimed is:

1. In a multi-processor computer system having a cache sharing linked list comprising a head entry and one or more member entries, a last entry in the list being a tail entry, a method for updating said list comprising the steps of:
   creating a copy of one member entry;
   making said copy the head of said list;
   updating said copy;
   characterizing all entries other than said head as stale entries; and
   concurrently invalidating said stale entries in both directions from head-to-tail and from tail-to-head.

2. The method of claim 1 wherein the step of invalidating stale entries in the direction from head-to-tail comprises the steps of:
   (1) said head informing a next entry that said next entry is about to be invalidated;
   (2) said next entry informing said head of the identity of said next entry's succeeding entry's;
   (3) invalidating said entry;
   (4) making said succeeding entry a next entry; and
   (5) repeating steps (1) through (4) until invalidation is complete.

3. The method of claim 1 wherein the step of invalidating said stale entries in the direction from head-to-tail comprises the steps of:
   (1) said head informing a next entry that invalidation of stale copies is about to occur;
   (2) said next entry informing said head that an invalidation complete signal will be returned to said head;
   (3) invalidating stale entries in the direction toward said tail; and
   (4) said next entry, upon being invalidated last, sending said complete signal to said head.

4. The method of claim 1 wherein the step of invalidating said stale entries in the direction from tail-to-head comprises the steps of:
   (1) said tail entry informing said tail entry's preceding entry that said preceding entry is about to become a tail entry and that said preceding entry will be invalidated after becoming a tail entry;
   (2) making said preceding entry a tail entry; and
   (3) repeating steps (1) and (2) until invalidation is complete.

5. The method of claim 1 wherein a request to update said list is associated with said member entry.

6. The method of claim 5 wherein said member entry is said tail entry.

7. The method of claim 1 wherein said method, in accordance with standard cache coherence protocols, updates said list from read-only to read-write.

8. The method of claim 1 comprising the further step of detecting a deadlock condition in said computer system.

9. The method of claim 8 wherein the step of invalidating stale entries in the direction from head-to-tail invalidates the stale entries based on whether said deadlock condition is detected.

10. The method of claim 8 comprising the further step of selecting a slow method for invalidating stale entries if said deadlock condition is detected.

11. In a multi-processor computer system having a cache sharing linked list comprising a head entry and one or more member entries, a last entry in the list being a tail entry, an apparatus for updating said list comprising:

means for creating a copy of one member entry;

means for making said copy the head of said list;

means for updating said copy;

means for characterizing all entries other than said head as stale entries; and means for concurrently invalidating said stale entries in both directions from head-to-tail and from tail-to-head.

12. The apparatus of claim 11 wherein the means for invalidating stale entries in the direction from head-to-tail comprises:

(1) means for said head to inform a next entry that said next entry is about to be invalidated;

(2) means for said next entry to inform said head of the identity of said next entry's succeeding entry;

(3) means for invalidating said next entry;

(4) means for making said succeeding entry a next entry; and (5) means for using the means for in (1) through (4) until invalidation is complete.

13. The apparatus of claim 11 wherein the means for invalidating said stale entries in the direction from head-to-tail comprises:

means for said head to inform a next entry that invalidation of stale copies is about to occur;

means for said next entry to inform said head that an invalidation complete signal will be returned to said head;

means for invalidating stale entries in the direction toward said tail; and means for said next entry, upon being invalidated last, to send said complete signal to said head.

14. The apparatus of claim 11 wherein the means for invalidating said stale entries in the direction from tail-to-head comprises:

(1) means for said tail entry to inform said tail entry's preceding entry that said preceding entry is about to become a tail entry and that said preceding entry will be invalidated after becoming a tail entry;

(2) means for making said preceding entry a tail entry; and (3) means for using the means for in (1) and (2) until invalidation is complete.

15. The apparatus of claim 11 wherein a request to update said list is associated with said member entry.

16. The apparatus of claim 15 wherein said member entry is said tail entry.

17. The apparatus of claim 11, in accordance with standard cache coherence protocols, updates said list from read-only to read-write.

18. The apparatus of claim 11 further comprising means for detecting a deadlock condition in said computer system.

19. The apparatus of claim 18 wherein the means for invalidating stale entries in the direction from head-to-tail invalidates the stale entries based on whether said deadlock condition is detected.

20. The apparatus of claim 18 further comprising means for selecting a slow method for invalidating stale entries if said deadlock condition is detected.

* * * * *